(12) United States Patent
Conklin

(10) Patent No.: US 10,310,475 B2
(45) Date of Patent: Jun. 4, 2019

(54) SYSTEM AND METHOD OF OPERATING A VARIABLE SPEED HVAC SYSTEM

(71) Applicant: Carrier Corporation, Palm Beach Gardens, FL (US)

(72) Inventor: Nick Conklin, Atlanta, GA (US)

(73) Assignee: CARRIER CORPORATION, Farmington, CT (US)

( * ) Notice: Subject to any disclaimer, the term of this patent is extended or adjusted under 35 U.S.C. 154(b) by 291 days.

(21) Appl. No.: 15/288,868

(22) Filed: Oct. 7, 2016

(65) Prior Publication Data

US 2017/0102160 A1     Apr. 13, 2017

Related U.S. Application Data

(60) Provisional application No. 62/239,716, filed on Oct. 9, 2015.

(51) Int. Cl.
    G05B 19/042      (2006.01)
    F24F 11/00       (2018.01)
    (Continued)

(52) U.S. Cl.
    CPC .......... *G05B 19/0428* (2013.01); *F24F 11/70* (2018.01); *F24F 11/83* (2018.01);
    (Continued)

(58) Field of Classification Search
    CPC .. F24F 11/0076; F24F 11/0012; F24F 11/006; F24F 11/64; F24F 11/70;
    (Continued)

(56) References Cited

U.S. PATENT DOCUMENTS 4,364,237 A   12/1982   Cooper et al.
4,795,088 A   1/1989    Kobayashi et al.
(Continued)

FOREIGN PATENT DOCUMENTS

JP    H01289759 A    11/1989
JP    2006275460 A   10/2006
(Continued)

OTHER PUBLICATIONS

ACWholesalers, "Mitsubishi Thermostat Interface", available at: https://www.acwholesalers.com/Mitsubishi-Air-Conditioners/PAC-US444CN-1-Mitsubishi-Thermostat-Interface/54596.ac, accessed Jun. 29, 2018, 3 pages.

*Primary Examiner* — Chun Cao
(74) *Attorney, Agent, or Firm* — Cantor Colburn LLP

(57) ABSTRACT

A system and method of operating an HVAC system, the HVAC system including a HVAC unit including a variable speed HVAC component in communication with a unit controller, an interface device in communication with the unit controller, and a single-speed system controller in communication with the interface device, the method including operating the interface device to receive a first conditioning signal from the system controller, operating the interface device to determine a temperature differential when the first conditioning signal is received, operating the interface device to transmit the temperature differential to the unit controller, operating the unit controller to transmit a speed signal based on the temperature differential, operating the interface device to receive a second conditioning signal, and operating the interface device to update the at least one set point estimate when second conditioning signal is received.

19 Claims, 2 Drawing Sheets

(51) Int. Cl.
*F25B 49/02* (2006.01)
*F24F 11/70* (2018.01)
*F24F 11/83* (2018.01)
*F24F 11/64* (2018.01)

(52) U.S. Cl.
CPC ............... *F25B 49/02* (2013.01); *F24F 11/64* (2018.01); *F25B 2600/0253* (2013.01); *F25B 2700/2104* (2013.01); *Y02B 30/741* (2013.01)

(58) Field of Classification Search
CPC ............... F24F 11/83; F24F 2011/0063; F25B 2600/0253; F25B 2700/2104; F25B 49/02; G05B 19/0428; G05B 2219/2614; Y02B 30/741
USPC .................................................. 700/276, 278
See application file for complete search history.

(56) References Cited

U.S. PATENT DOCUMENTS

| | | | |
|---|---|---|---|
| 5,220,255 A * | 6/1993 | Alford | G05D 23/1913 |
| | | | 318/400.08 |
| 5,410,230 A | 4/1995 | Bessler et al. | |
| 5,568,732 A * | 10/1996 | Isshiki | F25B 13/00 |
| | | | 62/129 |
| 5,806,760 A | 9/1998 | Maiello | |
| 6,134,901 A | 10/2000 | Harvest et al. | |
| 6,244,515 B1 | 6/2001 | Rowlette et al. | |
| 6,282,910 B1 | 9/2001 | Helt | |
| 6,456,023 B1 * | 9/2002 | Becerra | H02P 6/34 |
| | | | 318/400.26 |
| 7,106,019 B2 * | 9/2006 | Becerra | H02P 6/34 |
| | | | 318/400.01 |
| 7,296,426 B2 | 11/2007 | Butler | |
| 7,513,123 B2 | 4/2009 | Lee et al. | |
| 7,513,124 B2 | 4/2009 | Lee et al. | |
| 8,011,199 B1 | 9/2011 | Chen et al. | |
| 8,983,665 B2 | 3/2015 | Maass | |
| 9,074,787 B2 | 7/2015 | Kitagishi et al. | |
| 9,614,468 B2 * | 4/2017 | Hu | H02P 6/08 |
| 2006/0156748 A1 | 7/2006 | Lee et al. | |
| 2006/0283198 A1 | 12/2006 | Song et al. | |
| 2007/0079620 A1 | 4/2007 | Lee | |
| 2009/0277196 A1 | 11/2009 | Gambiana et al. | |
| 2010/0082162 A1 | 4/2010 | Mundy | |
| 2011/0309155 A1 | 12/2011 | Thompson | |
| 2013/0153197 A1 | 6/2013 | Havard et al. | |
| 2013/0186111 A1 * | 7/2013 | Kim | F25B 49/022 |
| | | | 62/56 |
| 2017/0097183 A1 * | 4/2017 | Austin | F25B 49/022 |
| 2017/0254553 A1 * | 9/2017 | Leal | G05B 15/02 |

FOREIGN PATENT DOCUMENTS

| | | |
|---|---|---|
| JP | 2009210218 A | 9/2009 |
| WO | 2009099020 A1 | 8/2009 |
| WO | 2010141614 A2 | 12/2010 |

\* cited by examiner

SYSTEM AND METHOD OF OPERATING A VARIABLE SPEED HVAC SYSTEM

CROSS-REFERENCE TO RELATED APPLICATIONS

The present application is a nonprovisional patent application, which claims priority to 62/239,716, filed Oct. 9, 2015, which is herein incorporated in its entirety.

TECHNICAL FIELD OF THE DISCLOSED EMBODIMENTS

The presently disclosed embodiments generally relate to heating, ventilation, and air conditioning (HVAC) systems, and more particularly, to a system and method for operating a variable speed HVAC system.

BACKGROUND OF THE DISCLOSED EMBODIMENTS

An increasing number of HVAC units are using variable speed compressor technology to improve efficiency, comfort, and reliability. Variable speed systems typically work by connecting a motor control drive to the compressor and then connecting the line input power from the utility to the drive. The drive uses frequency modulation to adjust power output of the compressor motor enabling it to speed up or slow down according to the heating or cooling load in the home. This ability to modulate compressor capacity enables many of the advantages of variable speed technology including improved efficiency and comfort.

Generally, HVAC systems using variable speed compressor technology require a system control capable of communicating the indoor air temperature and outdoor air temperature for controlling the compressor. Generally, the communicating capability is a part of a proprietary protocol; thus, increasing the number of components of the system and increasing costs. There is therefore a need for a system and method to control a variable speed compressor at minimal costs.

SUMMARY OF THE DISCLOSED EMBODIMENTS

In one aspect, a method for operating an HVAC system, the HVAC system including a HVAC unit including a variable speed HVAC component in communication with a unit controller, an interface device in communication with the unit controller, and a single-speed system controller in communication with the interface device. The method includes operating the interface device to receive a first conditioning signal from the system controller, operating the interface device to determine a temperature differential, operating the interface device to transmit the temperature differential to the unit controller, operating the unit controller to transmit a speed signal to the variable speed HVAC component based on the temperature differential, and operating the interface device to receive a second conditioning signal.

In an embodiment, the first conditioning signal includes at least one of a heating on signal and a cooling on signal, and the second conditioning signal comprises at least one of a heating off signal and a cooling off signal. In an embodiment, the temperature differential includes the difference between a current space temperature and at least one set point estimate. In an embodiment, the at least one set point estimate includes a heating set point estimate or a cooling set point estimate.

In an embodiment, operating the unit controller to transmit a speed signal to the variable speed HVAC component based on the temperature differential includes operating the unit controller to transmit a speed signal indicative of a maximum heating operational speed if the current space temperature is greater than the heating set point estimate and if the first conditioning signal is a heating on signal; operating the unit controller to transmit a speed signal based on the temperature differential if the current space temperature is less than or equal to the heating set point estimate and if the first conditioning signal is a heating on signal; operating the unit controller to transmit a speed signal indicative of a maximum cooling operational speed if the current space temperature is less than the cooling set point estimate and if the first conditioning signal is a cooling on signal; and operating the unit controller to transmit a speed signal based on the temperature differential if the current space temperature is greater than or equal to the cooling set point estimate and if the first conditioning signal is a cooling on signal.

In an embodiment, operating the interface device to receive a second conditioning signal further includes operating the interface device to update the heating set point estimate to equal the current space temperature if the second conditioning signal is a heating off signal, and operating the interface device to update the cooling set point estimate to equal the current space temperature if the second conditioning signal is a cooling off signal.

In one aspect, and HVAC system is provided. The HVAC system includes an interface device including a processor configured to receive a first conditioning signal, determine a temperature differential when the first conditioning signal is received, transmit the temperature differential, and receive a second conditioning signal. The interface device further includes a memory in communication with the processor, and a temperature sensor in communication with the processor, the temperature sensor configured to measure a current space temperature.

In an embodiment, the temperature differential includes the difference between the current space temperature and at least one set point estimate. In an embodiment, the processor is further configured to update the heating set point estimate to equal the current space temperature if the second conditioning signal is a cooling off signal, and update the cooling set point estimate to equal the current space temperature if the second conditioning signal is a cooling off signal.

In an embodiment, the HVAC system further includes an HVAC unit in communication with the interface device. The HVAC unit includes a unit controller, and a variable speed component in communication with the unit controller. In an embodiment, the variable speed HVAC component includes at least one of a compressor and an indoor fan.

The unit controller is configured to receive the first conditioning signal and the temperature differential from the interface device, operate the variable speed component at a maximum heating operational speed if the current space temperature is greater than the heating set point estimate, and if the first conditioning signal is a heating on signal, operate the variable speed component at an operational speed based on the temperature differential if the current space temperature is less than or equal to the heating set point estimate, and if the first conditioning signal is a heating on signal, operate the variable speed component at a maximum cooling operational speed if the current space temperature is less than the cooling set point estimate, and if the first conditioning signal is a cooling on signal, and operate the variable speed component at an operational speed based on the temperature differential if the current space temperature is greater than or equal to the cooling set point estimate, and if the first conditioning signal is a cooling on signal.

In an embodiment, the HVAC system further includes a single-stage system controller in communication with the interface device, wherein the single-stage system controller is configured to transmit the first conditioning signal and the second conditioning signal. In an embodiment, the single-stage system controller is in either a wired or wireless communication with the interface device. In an embodiment, the single-stage system controller includes a thermostat.

In one aspect, an interface device is provided. The interface device includes a processor in communication with a memory. The processor is configured to operate a program stored in memory, the program configured to receive a first conditioning signal, determine a temperature differential when the first conditioning signal is received, transmit the temperature differential; and receive a second conditioning signal. The interface device further includes a temperature sensor in communication with the processor, the temperature sensor configured to measure a current space temperature. In an embodiment, the temperature differential includes a difference between the current space temperature and at least one set point estimate stored in the memory. In an embodiment, the at least one set point estimate includes a heating set point estimate or a cooling set point estimate.

In an embodiment, the program is further configured to update the heating set point estimate to equal the current space temperature if the second conditioning signal is a heating off signal, and update the cooling set point estimate to equal the current space temperature if the second conditioning signal is a cooling off signal.

DETAILED DESCRIPTION OF THE DISCLOSED EMBODIMENTS

Figure 1:
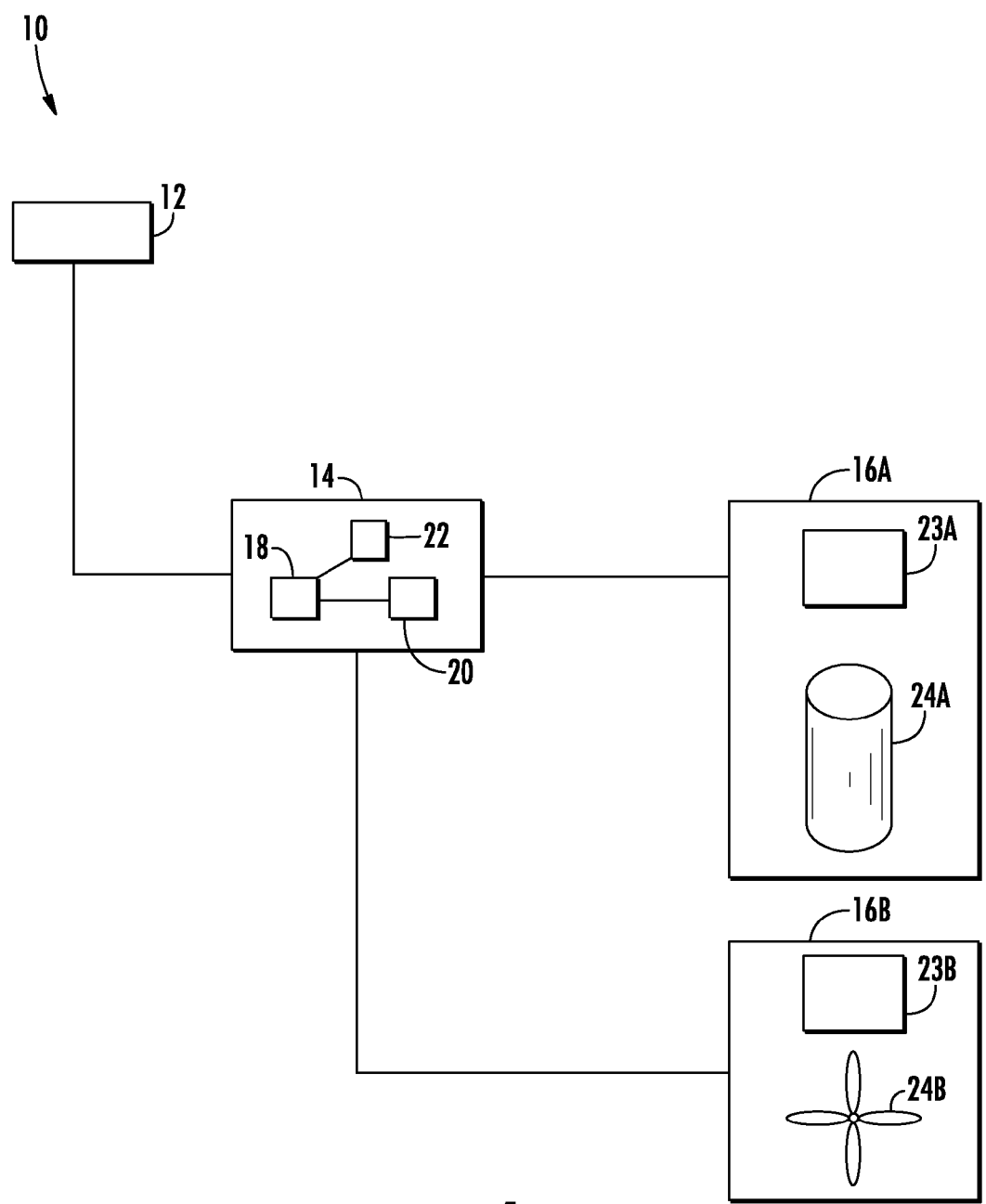
FIG. 1 illustrates a schematic diagram of a HVAC system according to an embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates an embodiment of an HVAC system, generally indicated at 10. The HVAC system 10 is configured to condition air within an interior space. The HVAC system 10 includes a single-speed system controller 12 in communication with an interface device 14 in further communication with an HVAC unit 16.

The single-speed system controller 12 is configured to transmit a plurality of on signals and off signals to heat or cool the interior space based at least in part upon the air temperature of the interior space. In an embodiment, the system controller 12 is in wireless electrical communication with the interface device 14. In another embodiment, the system controller 12 is in wired electrical communication with the interface device 14. In an embodiment, the single-speed system controller 12 includes a thermostat.

The interface device 14 may be located within the interior space. The interface device 14 is configured to receive the plurality of on and off signals from the single-speed system controller 12. The interface device 14 includes a processor 18 in communication with a memory 20 and in further communication with a temperature sensor 22. The temperature sensor 22 is configured to measure a space temperature within the interior space. In one embodiment, the interface device 14 may be disposed in a location other than within the interior space and the temperature sensor 22 may be disposed in the interior space and in communication with the interface device 14.

In the presently disclosed embodiments, the interface device 14 uses knowledge of when the single-speed system controller 12 issues on and off commands, as well as knowledge of the space temperature within the interior space as measured by the temperature sensor 22, to determine a cooling set point estimate and a heating set point estimate. The interface unit 14 uses the measured space temperature, cooling set point estimate, and the heating set point estimate to determine a temperature differential. The interface device 14 is tasked with transmitting the temperature differential to the variable speed HVAC unit 16; thus, allowing the variable speed HVAC unit 16 to operate at the appropriate level, according to its pre-programmed methods of operation, to achieve a set point temperature at which the user has set the single-speed system controller 12, but the interface device 14 does not know what the set point is as, in one embodiment, the single-speed system controller 12 communicates simply an on/off signal to the interface device 14. In one embodiment, the variable speed HVAC unit 16 is a standard variable speed HVAC unit as well known in the art. In some embodiments, such variable speed HVAC units achieve variable speed operation by receiving an interior temperature from a communicating thermostat as is understood by one of ordinary skill in the art.

The interface device 14 is configured to operate the temperature sensor 22 to measure a space temperature within the interior space when an on signal and an off signal are received from the single-speed system controller 12. The processor 18 and memory 20 are configured to compare the space temperature with the current heating set point estimate or the current cooling set point estimate depending on the mode of operation. If the space temperature does not equal the heating set point estimate or the cooling set point estimate, the processor 18 is further configured to update the heating set point estimate and the cooling set point estimate, respectively. The processor 18 is further configured to transmit a the temperature differential of the space temperature and the heating set point estimate or the cooling set point estimate (depending on the mode of operation) to operate the variable speed HVAC unit 16 at an operational speed determined by the variable speed HVAC unit 16. In one embodiment, the interface device 14 is coupled to the indoor portion of a split system-type HVAC system. In another embodiment, the interface device 14 is coupled to the indoor portion of a ductless split system or a variable refrigerant flow HVAC system.

The HVAC unit 16 includes a unit controller 23A or 23B (hereinafter 23) in communication with a variable speed HVAC component 24. The unit controller 23 is in further communication with the interface device 14. In one embodiment, the variable speed HVAC unit 16 is a standard variable speed HVAC unit as well known in the art. In some embodiments, such variable speed HVAC units achieve variable speed operation by receiving an interior temperature from a communicating thermostat as is understood by one of ordinary skill in the art.

In an embodiment, an HVAC unit 16A includes a variable speed compressor 24A. It will be appreciated that the compressor 24A may be disposed within an HVAC unit 16A including but not limited to a split system heat pump, air conditioner, packaged unit, geothermal heat pump, etc. to name a few non-limiting examples.

In another embodiment, an HVAC unit 16B includes a variable speed indoor fan 24B. It will be appreciated that the variable speed indoor fan 24B may be disposed within an HVAC unit 16B including but not limited to a furnace and a fan coil to name a couple of non-limiting examples. The variable speed HVAC component 24 is configured to operate at a plurality of speeds in a heating or cooling mode to deliver either a compressed refrigerant or deliver air to the interior space.

Figure 2:
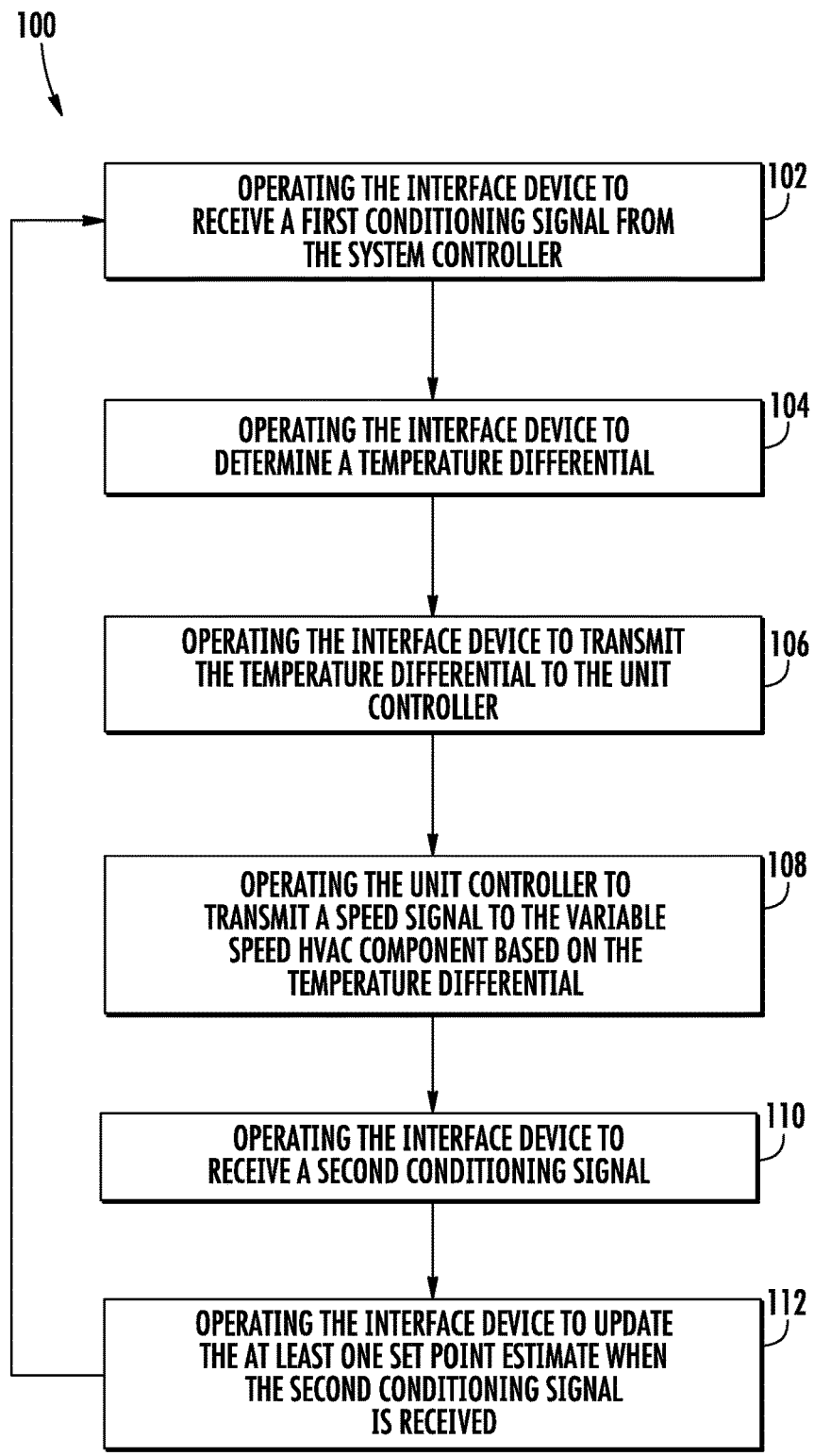
FIG. 2 illustrates a schematic flow diagram of a method of controlling a variable speed HVAC unit with a single-speed thermostat according to one embodiment of the present disclosure.

FIG. 2 illustrates a method of operating the HVAC system 10, the method generally indicated at 100. The method 100 includes step 102 of operating the interface device 14 to receive a first conditioning signal from the single-speed system controller 12. In an embodiment, the first conditioning signal includes at least one of a heating on signal and a cooling on signal.

The method 100 further includes step 104 of operating the interface device 14 to determine a temperature differential. In an embodiment the temperature differential includes the difference between a current space temperature within the interior space and at least one set point estimate when the first conditioning signal is received. In an embodiment, the at least one set point estimate includes a heating set point estimate or a cooling set point estimate.

The method 100 further includes step 106 of operating the interface device 14 to transmit the temperature differential to the unit controller 23A and/or 23B, and step 108 includes operating the unit controller 23A and/or 23B to transmit a speed signal to the variable speed HVAC component 24A and/or 24B based on the temperature differential. In an embodiment, for a cooling mode of operation, if a cooling on signal is received from the single-speed system controller 12 and the current space temperature is less than the cooling set point estimate, the interface device 14 will transmit the temperature differential information indicative of a negative temperature difference between the current space temperature and the cooling set point estimate. As such, the variable HVAC component 24 will operate at a maximum cooling operational speed. It will be appreciated that the temperature differential may be reversed such that the variable speed HVAC component 14 will operate at a maximum cooling operational speed when a positive temperature differential is received by determining whether the cooling set point estimate is greater than the current space temperature.

If, on the other hand, the current space temperature is greater than or equal to the cooling set point estimate, the interface device 14 will transmit temperature differential information indicative of a positive temperature difference between the current space temperature and the cooling set point estimate. As such, the variable speed HVAC component 24 will operate at a speed based on the temperature differential (in the case of an initial start up the variable speed HVAC component 24 will operate at the lowest default operational speed). It will be appreciated that the temperature differential may be reversed such that the variable speed HVAC component 14 will operate at a speed based on the temperature differential when a negative temperature differential is received by determining whether the cooling set point estimate is less than the current space temperature.

In an embodiment, for a heating mode of operation, if, a heating on signal is received from the single-speed system controller 12 and the current space temperature is greater than the heating set point estimate, the interface device 14 will transmit temperature differential information indicative of a positive temperature difference between the current space temperature and the heating set point estimate. As such, the variable speed HVAC component 24 will operate at a maximum heating operational speed. It will be appreciated that the temperature differential may be reversed such that the variable speed HVAC component 14 will operate at a maximum heating operational speed when a negative temperature differential is received by determining whether the heating set point estimate is less than the current space temperature.

If, on the other hand, the current space temperature is less than or equal to the heating set point estimate, the interface device 14 will transmit temperature differential information indicative of negative temperature difference between the current space temperature and the heating set point estimate. As such, the variable speed HVAC component 24 will operate at a speed based on the temperature differential (in the case of an initial start up the variable speed HVAC component 24 will operate at the highest default operational speed). It will be appreciated that the temperature differential may be reversed such that the variable speed HVAC component 14 will operate at a speed based on the temperature differential when a positive temperature differential is received by determining whether the heating set point estimate is greater than the current space temperature.

The method 100 further includes step 110 of operating the interface device 14 to receive a second conditioning signal from the single-speed system controller 12. In an embodiment, the second conditioning signal includes at least one of a heating off signal and a cooling off signal.

The method 100 further includes step 112 of operating the interface device 14 to update the at least one set point estimate. In an embodiment, whenever the interface device 14 receives an "off" signal from the single-speed system controller 12, the current space temperature is saved as the cooling set point estimate (in a cooling mode of operation) or the heating set point estimate (in a heating mode of operation).

In an embodiment, for a cooling mode operation, if a cooling on signal is received from the single-speed system controller 12 and the current space temperature is less than the cooling set point estimate, the interface device 14 updates the cooling set point estimate to equal the current space temperature. In an embodiment, if a cooling off signal is received from the single-speed system controller 12 and the current space temperature is greater than the cooling set point estimate, the interface device 14 updates the cooling set point estimate to equal the current space temperature.

In an embodiment, for a heating mode of operation, if a heating on signal is received from the single-speed system controller 12 and the current space temperature is greater than the heating set point estimate, the interface device 14 updates the heating set point estimate to equal the current space temperature. In an embodiment, if a heating on signal is received from the single-speed system controller 12 and the current space temperature is less than the heating set point estimate, the interface device 14 updates the heating set point estimate to equal the current space temperature.

In one example of a cooling operation, if under any circumstance the space temperature within the interior space is above a desired single-speed system controller 12 set point temperature, the single-speed system controller 12 sends a cooling on signal to operate the HVAC system 10 in a cooling mode.

The interface device 14 receives the cooling on signal from the single-speed system controller 12, and the interface device 14 transmits the cooling on signal to the HVAC unit 16A and/or 16B. When the cooling on signal is received, the temperature sensor 22 measures the current space temperature within the interior space, and the processor 18 determines a temperature differential by comparing the current space temperature within the interior space (e.g. 74° F.) to the cooling set point estimate (e.g. 68° F.). The processor 18 transmits the temperature differential information (e.g. 74° F.−68° F.=+6° F.) to the unit controller 23 in order to operate the variable speed component 24A and/or 24B based on temperature differential information.

It will be appreciated that the temperature sensor 22 may measure the current space temperature within the interior space continuously or intermittently. It will also be appreciated that the cooling set point estimate may be a factory default setting, or initially established by the first cooling mode operation according the method 100 as described herein. In one embodiment, the cooling set point estimate may be greater than or less than 68° F.

In this example, the interface device 14 transmits the positive temperature differential information to the unit controller 23 to operate the variable speed HVAC component 24A and/or 24B at an appropriate speed based on the positive temperature differential of +6° F. In an initial start-up of the HVAC unit 16A and/or 16B or if the HVAC unit 16A and/or 16B has not operated in a cooling mode within pre-determined amount of time, the variable speed HVAC component 24A and/or 24B may operate at the lowest default operational speed. The unit controller 23 may increase the speed of the variable speed HVAC component 24A and/or 24B based in part on the amount of time the variable speed HVAC component 24A and/or 24B operates at a particular speed.

Once the space temperature within the interior space is equal to the controller set point temperature (71° F.), the single-speed system controller 12 sends a cooling off signal to (or removes the cooling on signal from) the interface device 14. The interface device 14 further transmits the off signal to the HVAC unit 16A and/or 16B to cease operation of the variable speed HVAC component 24A and/or 24B. Since the current space temperature (71° F.) is greater than the previous cooling set point estimate (68° F.) when the off signal is received by the interface device 14, the processor 18 updates and the cooling set point estimate to equal the current space temperature (i.e. 71° F.), and records it in memory 20. The updated cooling set point estimate is used in subsequent cooling operations.

To continue with another cooling cycle, if the single-speed system controller 12 set point temperature is subsequently changed to 69° F., the temperature sensor 22 measures the current space temperature (i.e. 71° F.) when the cooling on signal is received, and the processor 18 determines the difference between the current space temperature and the cooling set point estimate (i.e. 71° F.). Since the current space temperature is less than or equal to the cooling set point estimate, the interface device 14 transmits the temperature differential information (i.e. 71° F.−71° F.=0° F.) to the unit controller 23. The unit controller 23 operates the variable speed HVAC component 24A and/or 24B at the maximum operational speed for cooling to reach the desired temperature as quickly as possible because the interface device 14 cannot discern the new desired controller set point temperature.

Once the space temperature within the interior space is equal to the controller 12 set point temperature (69° F.), the single-speed system controller 12 sends a cooling off signal (or removes the cooling on signal) to the interface device 14. The interface device 14 further transmits the off signal to the HVAC unit 16A and/or 16B to cease operation of the variable speed HVAC component 24A and/or 24B. The interface device 14 updates the cooling set point estimate to equal the current space temperature (i.e. 69° F.) when the off signal is received. The updated cooling set point estimate is used in subsequent cooling operations.

In one example of a heating operation, if under any circumstance the space temperature is below a desired single-speed controller 12 set point temperature, the single-speed system controller 12 sends a heating on signal to operate the HVAC system 10 in a heating mode.

The interface device 14 receives the heating on signal from the single-speed system controller 12, and the interface device 14 transmits the heating on signal to the HVAC unit 16. When the heating on signal is received, the temperature sensor 22 measures the current space temperature within the interior space, and the processor 18 determines a temperature differential by comparing the current space temperature within the interior space (e.g. 69° F.) to the heating set point estimate (e.g. 77° F.). The processor 18 transmits the temperature differential information (e.g. 69° F.−77° F.=−8° F.) to the unit controller 23 in order to operate the variable speed component 24A and/or 24B based on the temperature differential information. It will be appreciated that the heating set point estimate may be a factory default setting, or initially established by the first heating mode operation according the method 100 as described herein.

In this example, the interface device 14 transmits the negative temperature differential information to the unit controller 23 to operate the variable speed HVAC component 24A and/or 24B at an appropriate speed based on the negative temperature differential of −8° F.

In an initial start-up of the HVAC unit 16A and/or 16B or if the HVAC unit 16A and/or 16B has not operated in a heating mode within a predetermined amount of time, the variable speed HVAC component 24A and/or 24B may operate at the highest default operational speed. The unit controller 23 may transmit speed signals to decrease the speed of the variable speed HVAC component 24 based in part on the amount of time the variable speed HVAC component 24A and/or 24B operates at a particular speed.

Once the space temperature within the interior space is equal to the controller set point temperature (72° F.), the single-speed system controller 12 sends a heating off signal to (or removes the heating on signal from) the interface device 14. The interface device 14 further transmits the off signal to the HVAC unit 16A and/or 16B to cease operation of the variable speed HVAC component 24A and/or 24B. Since the current space temperature (72° F.) is less than the previous heating set point estimate (77° F.) when the off signal is received by the interface device 14, the processor 18 updates the heating set point estimate to equal the current space temperature (i.e. 72° F.) and records it in memory 20. The updated heating set point estimate is used in subsequent heating operations.

To continue with another heating cycle, if the single-system system controller 12 set point temperature is subsequently changed to 74° F., the temperature sensor 22 measures the current space temperature (i.e. 72° F.) when the heating on signal is received, and the processor 18 determines if the difference between the current space temperature and the heating set point estimate (e.g. 72° F.). Since the current space temperature is greater than or equal to the heating set point estimate, the interface device 14 transmits the temperature differential information (i.e. 72° F.–72° F.=0° F.) to the unit controller 23. The unit controller 23 operates the variable speed HVAC component 24A and/or 24B at the maximum operational speed for heating to reach the desired temperature as quickly as possible because the interface device 14 cannot discern the new desired controller set point temperature.

Once the space temperature within the interior space is equal to the controller 12 set point temperature (74° F.), the single-speed system controller 12 sends a heating off signal (or removes the heating on signal) to the interface device 14. The interface device 14 further transmits the off signal to the HVAC unit 16A and/or 16B to cease operation of the variable speed HVAC component 24A and/or 24B. The interface device 14 updates the heating set point estimate to equal the current space temperature (i.e. 74° F.) when the off signal is received. The updated heating set point estimate is used in subsequent heating operations.

It will therefore be appreciated that the present embodiments includes a system and method of operating an HVAC unit 16A and/or 16B including a variable speed compressor 24A and/or 24B with a single-speed system controller 12 by using an interface device 14 that estimates the current set point of the single-speed system controller 12 based upon the sensed temperature of the interior space when conditioning signals are received from the single-speed system controller 12.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for operating an HVAC system, the HVAC system including a HVAC unit including a variable speed HVAC component in communication with a unit controller, an interface device in communication with the unit controller, and a single-speed system controller in communication with the interface device, the method comprising:
   (a) operating the interface device to receive a first conditioning signal from the single-speed system controller, wherein the single-speed system controller is configured to receive a user selected set point temperature from a user and to transmit the first conditioning signal from the single-speed system controller to the interface device, wherein the first conditioning signal that is transmitted from the single-speed system controller to the interface device does not include the user selected set point temperature;
   (b) operating the interface device to determine a temperature differential;
   (c) operating the interface device to transmit the temperature differential to the unit controller;
   (d) operating the unit controller to transmit a speed signal to the variable speed HVAC component based on the temperature differential; and
   (e) operating the interface device to receive a second conditioning signal from the single-speed system controller.

2. The method of claim 1, wherein the first conditioning signal comprises at least one of a heating on signal and a cooling on signal, and the second conditioning signal comprises at least one of a heating off signal and a cooling off signal, wherein the first conditioning signal and the second conditioning signal do not include the user selected set point temperature.

3. The method of claim 2, wherein the temperature differential comprises the difference between a current space temperature and at least one set point estimate.

4. The method of claim 3, wherein the at least one set point estimate comprises a heating set point estimate or a cooling set point estimate.

5. The method of claim 4, wherein step (d) comprises:
   (i) if the first conditioning signal is a heating on signal, operating the unit controller to transmit a speed signal indicative of a maximum heating operational speed if the current space temperature is greater than the heating set point estimate;
   (ii) if the first conditioning signal is a heating on signal, operating the unit controller to transmit a speed signal based on the temperature differential if the current space temperature is less than or equal to the heating set point estimate;
   (iii) if the first conditioning signal is a cooling on signal, operating the unit controller to transmit a speed signal indicative of a maximum cooling operational speed if the current space temperature is less than the cooling set point estimate; and
   (iv) if the first conditioning signal is a cooling on signal, operating the unit controller to transmit a speed signal based on the temperature differential if the current space temperature is greater than or equal to the cooling set point estimate.

6. The method of claim 5, wherein step (e) further comprises:
   (i) operating the interface device to update the heating set point estimate to equal the current space temperature if the second conditioning signal is a heating off signal; and
   (ii) operating the interface device to update the cooling set point estimate to equal the current space temperature if the second conditioning signal is a cooling off signal.

7. An HVAC system comprising:
   a single speed-system controller;
   an interface device in communication with the single speed-system controller, the interface device comprising:
      a processor;
      a memory in communication with the processor; and
      a temperature sensor in communication with the processor, the temperature sensor configured to measure a current space temperature;
   wherein the processor is configured to
      (a) receive a first conditioning signal from the single-speed system controller, wherein the single-speed system controller is configured to receive a user selected set point temperature from a user and to transmit the first conditioning signal from the single-speed system controller to the interface device, wherein the first conditioning signal that is transmitted from the single-speed system controller to the interface device does not include the user selected set point temperature;
      (b) determine a temperature differential when the first conditioning signal is received;
      (c) transmit the temperature differential; and (d) receive a second conditioning signal from the single-speed system controller.

8. The HVAC system of claim 7, wherein the temperature differential comprises the difference between the current space temperature and at least one set point estimate.

9. The HVAC system of claim 8, wherein the at least one set point estimate comprises a heating set point estimate or a cooling set point estimate.

10. The HVAC system of claim 9, wherein the processor is further configured to:
  (i) update the heating set point estimate to equal the current space temperature if the second conditioning signal is a cooling off signal; and
  (ii) update the cooling set point estimate to equal the current space temperature if the second conditioning signal is a cooling off signal.

11. The HVAC system of claim 9, further comprising an HVAC unit in communication with the interface device, the HVAC unit comprising:
  a unit controller; and
  a variable speed component in communication with the unit controller;
  wherein the unit controller is configured to:
    (a) receive the first conditioning signal and the temperature differential from the interface device;
    (b) operate the variable speed component at a maximum heating operational speed if the current space temperature is greater than the heating set point estimate, and if the first conditioning signal is a heating on signal;
    (c) operate the variable speed component at an operational speed based on the temperature differential if the current space temperature is less than or equal to the heating set point estimate, and if the first conditioning signal is a heating on signal;
    (d) operate the variable speed component at a maximum cooling operational speed if the current space temperature is less than the cooling set point estimate, and if the first conditioning signal is a cooling on signal; and
    (e) operate the variable speed component at an operational speed based on the temperature differential if the current space temperature is greater than or equal to the cooling set point estimate, and if the first conditioning signal is a cooling on signal.

12. The HVAC system of claim 11, wherein the variable speed HVAC component comprises at least one of a compressor and an indoor fan.

13. The HVAC system on claim 7, wherein the single-speed system controller is further configured to transmit the second conditioning signal.

14. The HVAC system of claim 13, wherein the single-speed system controller is in either a wired or wireless communication with the interface device.

15. The HVAC system of claim 13, wherein the single-speed system controller comprises a thermostat.

16. An interface device comprising:
  a processor;
  a memory in communication with the processor; and
  a temperature sensor in communication with the processor, the temperature sensor configured to measure a current space temperature;
  wherein the processor is configured to operate a program stored in memory, the program configured to:
    (a) receive a first conditioning signal from a single-speed system controller, wherein the single-speed system controller is configured to receive a user selected set point temperature from a user and to transmit the first conditioning signal from the single-speed system controller to the interface device, wherein the first conditioning signal that is transmitted from the single-speed system controller to the interface device does not include the user selected set point temperature;
    (b) determine a temperature differential when the first conditioning signal is received;
    (c) transmit the temperature differential; and
    (d) receive a second conditioning signal from the single-speed system controller.

17. The interface device of claim 16, wherein the temperature differential comprises a difference between the current space temperature and at least one set point estimate stored in the memory.

18. The interface device of claim 17, wherein the at least one set point estimate comprises a heating set point estimate or a cooling set point estimate.

19. The interface device of claim 18, wherein the program is further configured to:
  (i) update the heating set point estimate to equal the current space temperature if the second conditioning signal is a heating off signal; and
  (ii) update the cooling set point estimate to equal the current space temperature if the second conditioning signal is a cooling off signal.

* * * * *